UNITED STATES PATENT OFFICE.

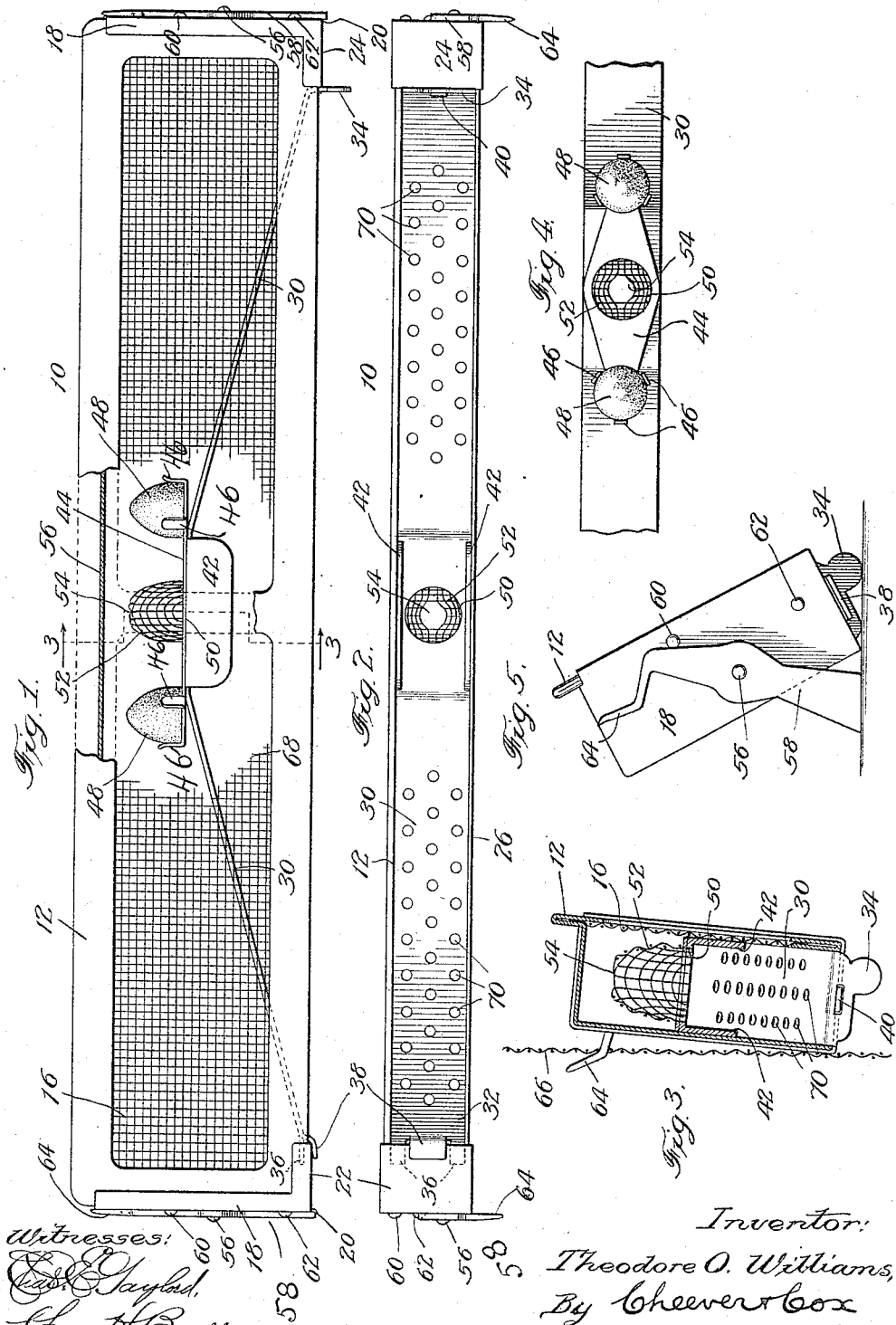

THEODORE O. WILLIAMS, OF CHICAGO, ILLINOIS.

INSECT-TRAP.

1,166,103. Specification of Letters Patent. Patented Dec. 28, 1915.

Application filed March 7, 1913. Serial No. 752,608.

*To all whom it may concern:*

Be it known that I, THEODORE O. WILLIAMS, a citizen of the United States, residing at Chicago, in the county of Cook and State of Illinois, have invented a certain new and useful Improvement in Insect-Traps, of which the following is a specification.

This invention relates to traps for use in catching any insect such as the common house fly.

The object of the invention is to provide a trap which can be easily and cheaply made, which can be readily adapted either to a window screen where flies are most common, or stood up upon a table or like support, said device being efficient in operation and not readily liable to get out of order.

The invention consists in a trap construction arranged and having the special advantages and features fully set forth in the specification.

In the drawings, Figure 1 is a front view, the plate or screen being partially removed so that the interior can be readily seen. Fig. 2 is an inverted plan view of the parts illustrated in Fig. 1. Fig. 3 is a vertical sectional detail view on the line 3—3 of Fig. 1. Fig. 4 is a plan view of the center portion of the bottom member of the trap removed from the complete device. Fig. 5 is an end view of the trap and a support therefor in position to stand upon a table or the like.

In the preferred form of the device which is illustrated in the drawings, a rectangular box 10 is provided of any suitable shape having preferably a transparent front plate 12 which in the particular form here illustrated is a wire screen 16. The box is, of course, provided with end members 18 which in the particular form of the device shown in the drawings are preferably bent around the lower corners 20 of the box and extend a short distance along the open bottom of the box in the horizontal members 22 and 24 respectively. For practical purposes of this invention, these members 22 and 24 are merely lugs of any suitable form extending from the side walls 18 toward the center of the trap.

The open space or bottom of the trap, bounded by the front wall 12, these lugs 22 and 24, and rear wall 26, is closed by a more or less arch-shaped spring bottom member 30 having suitably formed ends 32 and 34 adapted to engage and lock upon these lugs 22 and 24. These engaging devices on the ends of the bottom member may be of any suitable form without departing from this invention. In the particular case here illustrated, the end 22 is provided with two teeth 36 having between them another tooth 38, all of the teeth being stamped from the metal of the end 32, the intermediate tooth 38 being bent in one direction and the outside teeth 36 being bent in the opposite direction so that there is space between them for the interfitting of the lug 22 as is clearly shown in Figs. 1 and 2. In the construction at the opposite end of the bottom member the end 34 is bent vertically downward so as to form a handle in or near which is a small opening or slot into which the supplemental small lug 40 in member 24 fits. In order to remove the bottom member 30 from the trap, it is only necessary for the operator to take hold of the handle 34, spring the bottom 30 sufficiently to the left, as the parts are viewed in Fig. 1, so that the handle member 34 slips off from the lug 40, whereupon the entire bottom member 30 and attached parts may be removed from the device, the teeth 36—38, of course, being withdrawn from lug 22.

The center or apex of the bottom member 30 is reinforced by having downwardly turned flanges 42 formed thereon, and by having a supplemental plate 44 soldered or otherwise secured thereto. On the outer end of this plate 44 are upwardly turned posts or pins 46 arranged in any suitable configuration so as to receive and hold the bait 48 which is preferably of such composition, dry or liquid, that it attracts the flies into the trap and poisons them when they eat it.

Through the center of the arch-shaped bottom member 30 including its supplemental plate 44 is a hole 50 capped by a cone-shaped member 52 having at its upper end a smaller opening 54 just large enough so that a fly traveling upward can go through it and located so near the upper plate 56 of the trap so that a fly, once in the trap, cannot readily pass downward through this opening 54 and thence out through the cone 52, particularly in view of the fact that a fly always tries its best to crawl only upward.

Pivoted at 56 on each end 18 of the trap is a lever member 58 limited in movement by two stops 60 and 62 and having projecting to one side of its upper end the hook member 64 adapted to enter and engage ordinary wire window screen 66. The parts of this lever 58 are so shaped and arranged that when the lever is moved to the position of Fig. 3, this hook member 64 can pass through the meshes of the screen as shown in that figure and support the entire device on the screen with the open bottom in proximity to the screen so that flies going up the screen in the ordinary manner, will be quite apt to travel up into the space 68 below the bottom 30 of the trap and thence through the conical member 52 into it, and that when the lever is swung to the opposite extreme position, it forms a leg or support for the trap to stand upon a table as shown in Fig. 5, the hook 64 being against and shielded by the end 18 of the trap so that a person handling the trap is not apt to accidentally engage with the more or less sharpened end of the hook 64.

The arch-shaped bottom member 30 may be provided with perforations 70 so that flies coming to the trap can see any flies which are already in it and thus be tempted to travel up the under side of the arch to the entrance opening 50. The bottom is made arch-shaped so as to easily lead the incoming fly up its under side and to assist the dead flies inside in falling to the lower corners of the trap where they are out of the way.

In the operation of the device the purchaser of the trap snaps the handle 34 to the left as viewed in Fig. 1 and is thereupon able to remove the bottom member 30 in the manner described. He then places the bait 48, dry or liquid, in position and reinserts the bottom 30 in the obvious manner so that all the parts assume the position shown in Figs. 1 and 2. He then by properly manipulating the levers 58 applies the trap to the window screen as illustrated in Fig. 3 or rests it upon a table or other support as illustrated in Fig. 5. In either of these positions the flies enter the trap from the bottom in the manner fully described, eat the bait 48 and on being poisoned thereby roll down the arch-shaped bottom member 30 into the opposite corners of the trap where they are out of the way of the incoming flies. When a sufficient number of flies have been caught the operator merely removes the bottom 30 and lets the entrapped flies drop out. He then replaces the bottom member 30 and the operation is repeated.

Having thus described my invention, what I claim is new and desire to secure by Letters Patent is:

1. In a fly trap in combination with a trap proper, a lever pivoted to the end of the trap having one end formed as a leg to, when swung to position, support the trap in inclined position with reference to the table or other suitable support, the other end being formed as a hook adapted, when swung to position, to attach to a screen to secure the trap thereto.

2. In a fly trap in combination with a trap proper, a lever pivoted to the end of the trap having one end formed as a leg to, when swung to position, support the trap in inclined position with reference to the table or other suitable support, the other end being formed as a hook adapted, when swung to position, to attach to a screen to secure the trap thereto, said lever member being so located and proportioned that when moved to each of said positions the non-used end of the lever is protected by the end of the trap.

In witness whereof, I have hereunto subscribed my name in the presence of two witnesses.

THEODORE O. WILLIAMS.

Witnesses:
 DWIGHT B. CHEEVER,
 MAX S. ROSENZWEIG.

Copies of this patent may be obtained for five cents each, by addressing the "Commissioner of Patents, Washington, D. C."